United States Patent
Lee et al.

(10) Patent No.: US 10,772,045 B2
(45) Date of Patent: Sep. 8, 2020

(54) METHOD AND APPARATUS FOR CONTROLLING UPLINK POWER IN RACH-LESS HANDOVER

(71) Applicant: LG ELECTRONICS INC., Seoul (KR)

(72) Inventors: Youngdae Lee, Seoul (KR); Gwanmo Ku, Seoul (KR); Sangwon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 27 days.

(21) Appl. No.: 16/098,117

(22) PCT Filed: Apr. 25, 2017

(86) PCT No.: PCT/KR2017/004363
§ 371 (c)(1),
(2) Date: Oct. 31, 2018

(87) PCT Pub. No.: WO2017/191919
PCT Pub. Date: Nov. 9, 2017

(65) Prior Publication Data
US 2019/0150096 A1     May 16, 2019

Related U.S. Application Data

(60) Provisional application No. 62/330,238, filed on May 1, 2016.

(51) Int. Cl.
*H04W 52/14*     (2009.01)
*H04W 76/20*     (2018.01)
(Continued)

(52) U.S. Cl.
CPC ........ *H04W 52/14* (2013.01); *H04W 36/0011* (2013.01); *H04W 36/08* (2013.01);
(Continued)

(58) Field of Classification Search
None
See application file for complete search history.

(56) References Cited

U.S. PATENT DOCUMENTS

2014/0329554 A1* 11/2014 Froberg Olsson .. H04W 52/244
455/522
2015/0282031 A1* 10/2015 Kim ...................... H04L 1/0041
370/331
(Continued)

FOREIGN PATENT DOCUMENTS

KR     20140131285     11/2014
KR     20150017488     2/2015
(Continued)

OTHER PUBLICATIONS

PCT International Application No. PCT/KR2017/004363, International Search Report dated Jul. 20, 2017, 4 pages.

*Primary Examiner* — Christine T Duong
(74) *Attorney, Agent, or Firm* — Lee, Hong, Degerman, Kang & Waimey

(57) ABSTRACT

Provided are a method for a terminal controlling uplink power in a rando access channel-less (RACH-less) handover, and an apparatus for supporting same. The method may comprise the steps of: receiving, from a source base station, an RRC connection reconfiguration message including an uplink grant; transmitting, to a target base station using a first transmission power, an RRC connection reconfiguration complete message, on the basis of the uplink grant; receiving, from the target base station, a NACK corresponding to the RRC connection reconfiguration complete message; ramping the first transmission power to a second transmission power; and transmitting the RRC connection reconfiguration complete message using the ramped second transmission power.

16 Claims, 9 Drawing Sheets

(51) Int. Cl.
*H04W 36/08* (2009.01)
*H04W 52/40* (2009.01)
*H04W 52/50* (2009.01)
*H04W 52/48* (2009.01)
*H04W 52/24* (2009.01)
*H04W 52/36* (2009.01)
*H04W 52/32* (2009.01)
*H04W 36/00* (2009.01)

(52) U.S. Cl.
CPC ....... *H04W 52/247* (2013.01); *H04W 52/325* (2013.01); *H04W 52/36* (2013.01); *H04W 52/40* (2013.01); *H04W 52/48* (2013.01); *H04W 52/50* (2013.01); *H04W 76/20* (2018.02)

(56) References Cited

U.S. PATENT DOCUMENTS

| | | | |
|---|---|---|---|
| 2015/0319774 A1 | 11/2015 | Cai et al. | |
| 2016/0192261 A1* | 6/2016 | Wang | H04W 36/0055 370/331 |
| 2016/0381611 A1* | 12/2016 | Uchino | H04W 36/0061 370/331 |

FOREIGN PATENT DOCUMENTS

| | | |
|---|---|---|
| KR | 20150018702 | 2/2015 |
| WO | 2012162353 | 11/2012 |

\* cited by examiner

METHOD AND APPARATUS FOR CONTROLLING UPLINK POWER IN RACH-LESS HANDOVER

CROSS-REFERENCE TO RELATED APPLICATIONS

This application is the National Stage filing under 35 U.S.C. 371 of International Application No. PCT/KR2017/004363, filed on Apr. 25, 2017, which claims the benefit of U.S. Provisional Application No. 62/330,238, filed on May 1, 2016, the contents of which are all hereby incorporated by reference herein in their entirety.

BACKGROUND OF THE INVENTION

Field of the Invention

The present invention relates to a wireless communication system, and more particularly, to a method of controlling uplink power in an RACH-less handover, and an apparatus supporting the method.

Related Art

A long term evolution (LTE) system performs communication based on an orthogonal frequency division multiple access (OFDMA) technique in which frequency and time are used in a divided manner for a common channel. In a typical communication system, a handover technique exists for smooth communication of a user equipment (UE) which moves from one cell to another cell. Since the common channel is used by dividing frequency and time, the LTE system does not support a soft handover technique which performs communication by synchronizing signals between multiple cells, and supports only a hard handover technique in which communication is performed on only one cell at the same time.

In the LTE system, an enhanced node B (eNB) may manage a service and mobility of the UE through an RRC connection with the UE. There is a technique which can recover the RRC connection without having to stop the service upon occurrence of an error in a radio connection between the eNB and the UE, which is called RRC connection reestablishment.

There is ongoing discussion on a technique for reducing a handover delay time when performing a handover, by focusing on a data interruption time which occurs until a handover procedure is complete in a target cell immediately after the UE is commanded to perform the handover in a source cell. Several methods are under discussion such as a method in which random access is not necessary (RACH-less) in the target cell, a method in which a connection with the source cell is maintained until a procedure is complete in the target cell, or the like.

SUMMARY OF THE INVENTION

Meanwhile, a UE may fail to transmit/receive data from a time at which the UE disconnects a radio connection with a serving eNB to a time at which downlink data is first received upon success of a random access channel (RACH) procedure for a target eNB. Therefore, a handover without an RACH procedure was introduced to minimize a handover interrupt time in which the UE cannot transmit/receive data.

At present, initial power control in PUSCH for transmitting an RRC connection reconfiguration complete message may be based on PRACH preamble power and total power ramp. However, it may be impossible to refer to PRACH preamble power and total power ramp since the RACH-less handover skips the RACH procedure in a handover procedure. Therefore, there is a need to newly propose a method of controlling initial uplink power in the PUSCH when applying the RACH-less handover.

According to an embodiment, there is provided a method in which a UE controls uplink power in an RACH-less handover. The method may include: receiving, from a source base station, an RRC connection reconfiguration message including an uplink grant; transmitting, to a target base station, an RRC connection reconfiguration complete message with first transmission power based on the uplink grant; receiving NACK from the target base station in response to the RRC connection reconfiguration complete message; ramping the first transmission power to second transmission power; and transmitting the RRC connection reconfiguration complete message with the ramped second transmission power.

The method may further include receiving ramping information in response to the RRC connection reconfiguration complete message. The ramping information may include a ramping level for ramping the first transmission power to the second transmission power. The second transmission power may be ramped from the first transmission power based on the ramping level. The ramping information may include an indicator indicating whether power ramping will be stopped or not. The NACK and the ramping information may be received from the target base station through a physical hybrid ARQ indicator channel (PHICH).

The RRC connection reconfiguration complete message may be transmitted to the target base station through a physical uplink shared channel (PUSCH).

The first transmission power may be determined by the target base station. The RRC connection reconfiguration message may further include information on the first transmission power and power ramping.

The RACH-less handover may be a handover procedure in which a random access procedure is skipped. That is, the RACH-less handover may be a handover procedure in which the UE skips a random access procedure for the target base station.

The uplink grant may be transmitted from the target base station to the source base station by being included in a handover request ACK message.

The uplink grant may be pre-allocated to the UE through the RRC connection reconfiguration message.

According to another embodiment, there is provided a UE for controlling uplink power in an RACH-less handover. The UE may include: a memory; a transceiver; and a processor coupling the memory and the transceiver. The processor may be configured to: control the transceiver to receive, from a source base station, an RRC connection reconfiguration message including an uplink grant; control the transceiver to transmit, to a target base station, an RRC connection reconfiguration complete message with first transmission power based on the uplink grant; control the transceiver to receive NACK from the target base station in response to the RRC connection reconfiguration complete message; ramp the first transmission power to second transmission power; and control the transceiver to transmit the RRC connection reconfiguration complete message with the ramped second transmission power.

Uplink transmission power can be controlled in an RACH-less handover procedure.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
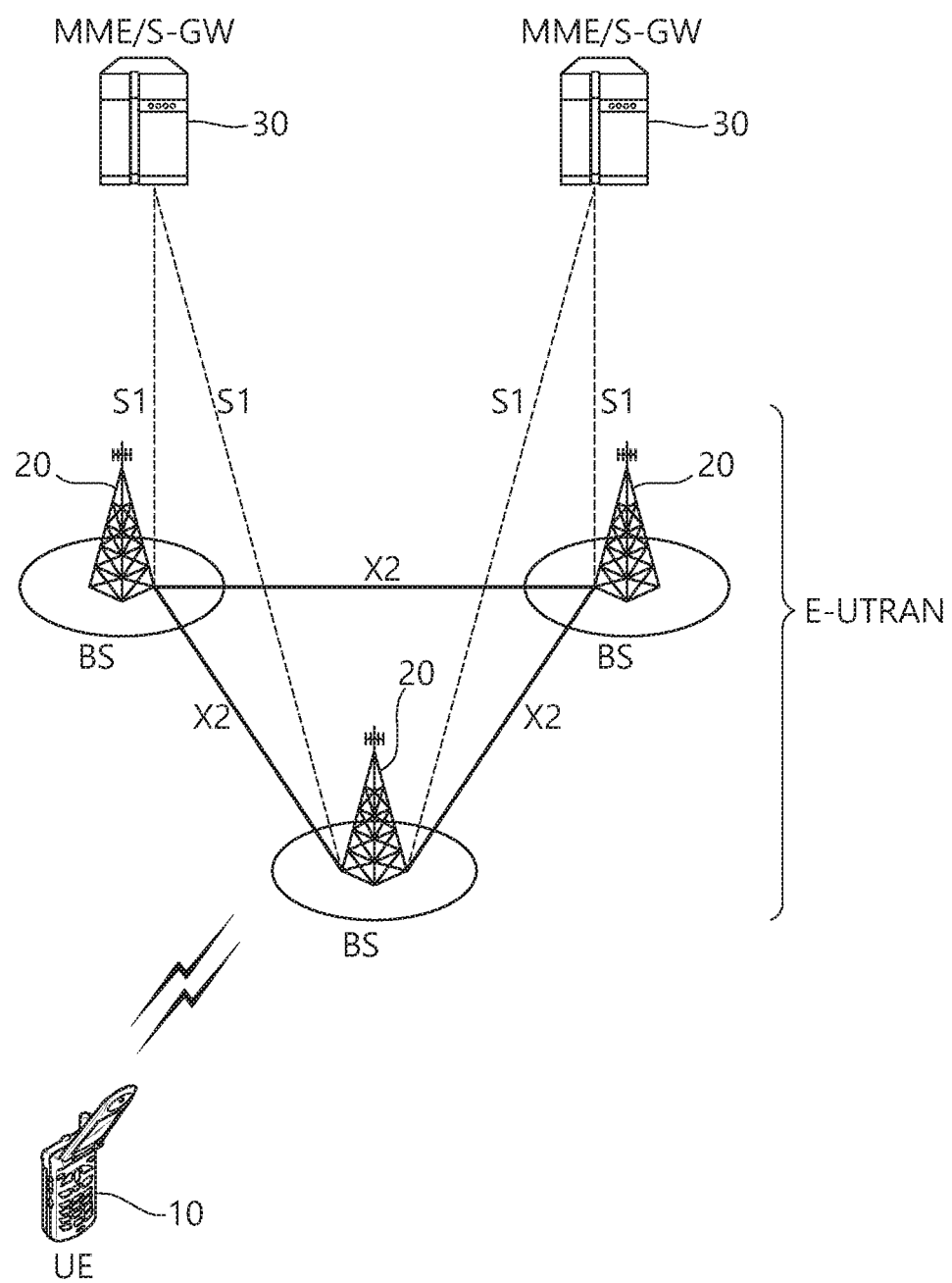
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
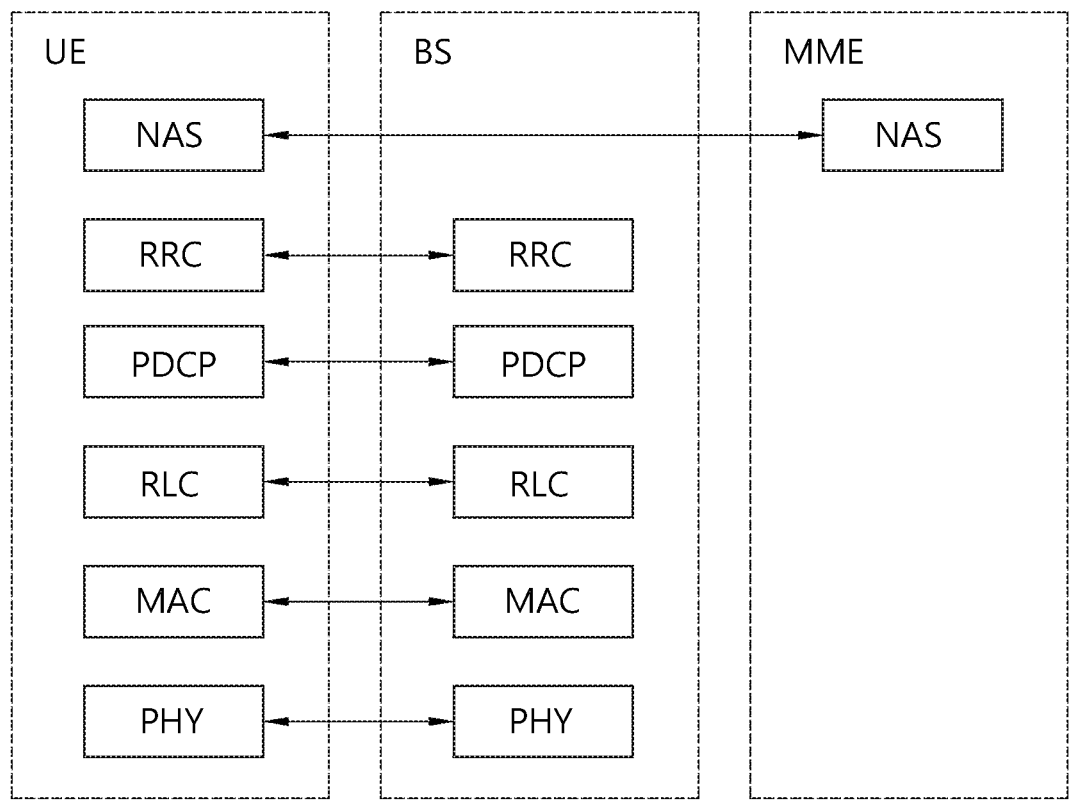
FIG. 2 shows a control plane of a radio interface protocol of an LTE system.
Figure 3:
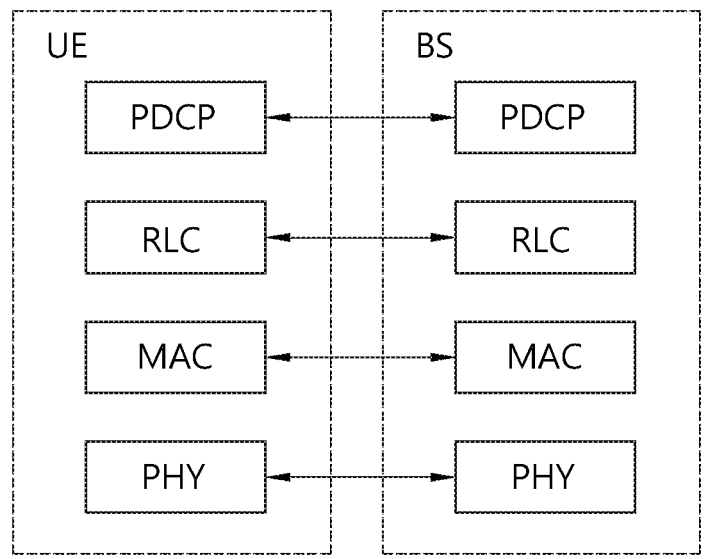
FIG. 3 shows a user plane of a radio interface protocol of an LTE system.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from an upper layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

A Non-Access Stratum (NAS) layer placed over the RRC layer performs functions, such as session management and mobility management.

Referring to FIG. 2, the RLC and MAC layers (terminated in the eNB on the network side) may perform functions such as scheduling, automatic repeat request (ARQ), and hybrid automatic repeat request (HARQ). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3, the RLC and MAC layers (terminated in the eNB on the network side) may perform the same functions for the control plane. The PDCP layer (terminated in the eNB on the network side) may perform the user plane functions such as header compression, integrity protection, and ciphering.

Hereinafter, an RRC State of a UE and RRC Connection Procedure are Described.

An RRC state indicates whether an RRC layer of the UE is logically connected to an RRC layer of the E-UTRAN. The RRC state may be divided into two different states such as an RRC connected state and an RRC idle state. When an RRC connection is established between the RRC layer of the UE and the RRC layer of the E-UTRAN, the UE is in RRC_CONNECTED, and otherwise the UE is in RRC_IDLE. Since the UE in RRC_CONNECTED has the RRC connection established with the E-UTRAN, the E-UTRAN may recognize the existence of the UE in RRC_CONNECTED and may effectively control the UE. Meanwhile, the UE in RRC_IDLE may not be recognized by the E-UTRAN, and a CN manages the UE in unit of a TA which is a larger area than a cell. That is, only the existence of the UE in RRC_IDLE is recognized in unit of a large area, and the UE must transition to RRC_CONNECTED to receive a typical mobile communication service such as voice or data communication.

In RRC_IDLE state, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell reselection. Also, in RRC_IDLE state, no RRC context is stored in the eNB.

In RRC_CONNECTED state, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED state, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE state, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion.

A paging message is transmitted over all cells belonging to the same tracking area. If the UE moves from one TA to another TA, the UE will send a tracking area update (TAU) message to the network to update its location.

When the user initially powers on the UE, the UE first searches for a proper cell and then remains in RRC_IDLE in the cell. When there is a need to establish an RRC connection, the UE which remains in RRC_IDLE establishes the RRC connection with the RRC of the E-UTRAN through an RRC connection procedure and then may transition to RRC_CONNECTED. The UE which remains in RRC_IDLE may need to establish the RRC connection with the E-UTRAN when uplink data transmission is necessary due to a user's call attempt or the like or when there is a need to transmit a response message upon receiving a paging message from the E-UTRAN.

To manage mobility of the UE in the NAS layer, two states are defined, i.e., an EPS mobility management-REGISTERED (EMM-REGISTERED) state and an EMM-DEREGISTERED state. These two states apply to the UE and the MME. Initially, the UE is in the EMM-DEREGISTERED state. To access a network, the UE performs a process of registering to the network through an initial attach procedure. If the attach procedure is successfully performed, the UE and the MME enter the EMM-REGISTERED state.

To manage a signaling connection between the UE and the EPC, two states are defined, i.e., an EPS connection management (ECM)-IDLE state and an ECM-CONNECTED state. These two states apply to the UE and the MME. When the UE in the ECM-IDLE state establishes an RRC connection with the E-UTRAN, the UE enters the ECM-CONNECTED state. When the MME in the ECM-IDLE state establishes an S1 connection with the E-UTRAN, the MME enters the ECM-CONNECTED state. When the UE is in the ECM-IDLE state, the E-UTRAN does not have context information of the UE. Therefore, the UE in the ECM-IDLE state performs a UE-based mobility related procedure such as cell selection or reselection without having to receive a command of the network. On the other hand, when the UE is in the ECM-CONNECTED state, mobility of the UE is managed by the command of the network. If a location of the UE in the ECM-IDLE state becomes different from a location known to the network, the UE reports the location of the UE to the network through a tracking area update procedure.

Figure 4:
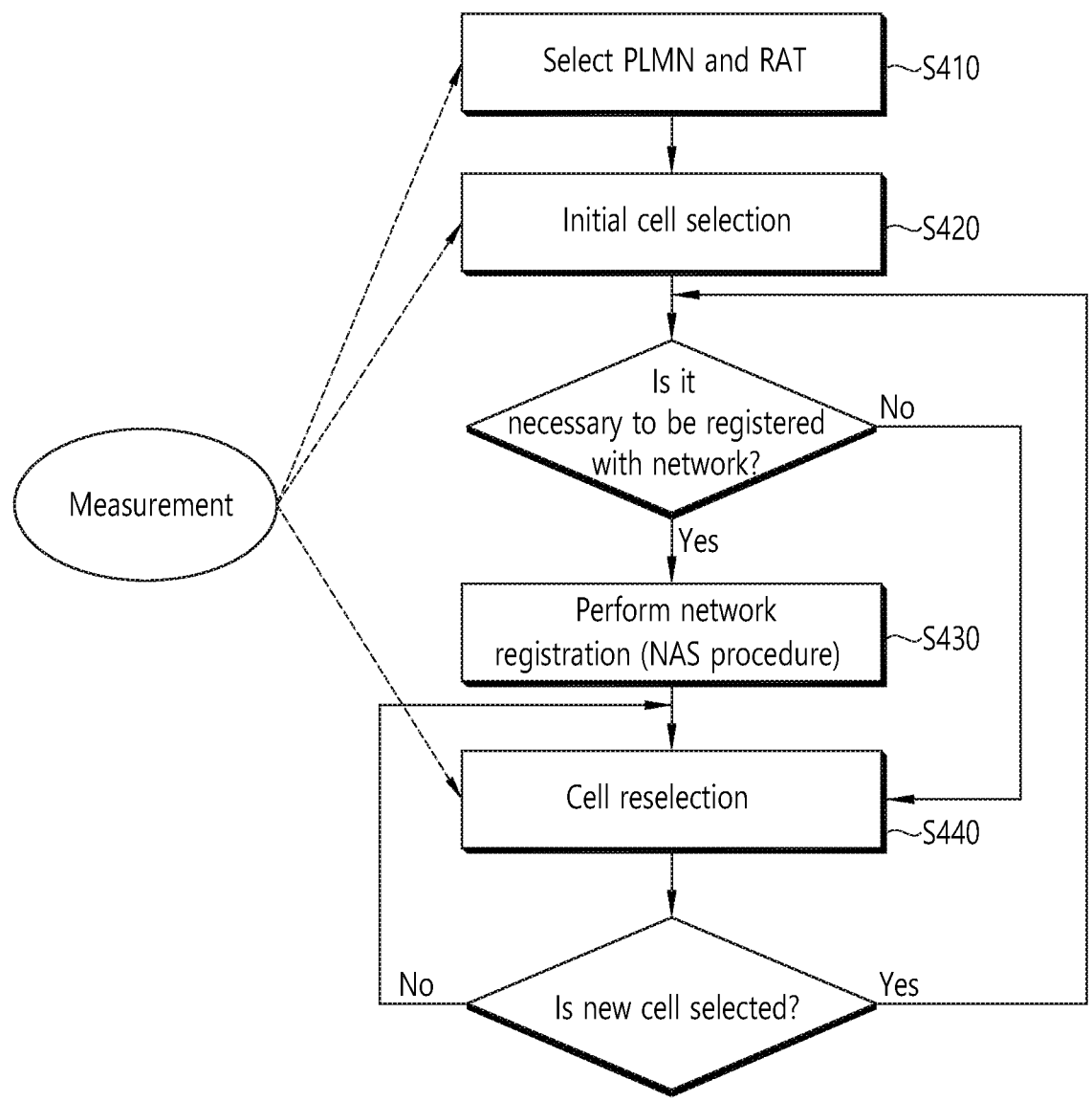
FIG. 4 shows a procedure in which UE that is initially powered on experiences a cell selection process, registers it with a network, and then performs cell reselection if necessary.

FIG. 4 shows a procedure in which UE that is initially powered on experiences a cell selection process, registers it with a network, and then performs cell reselection if necessary.

Referring to FIG. 4, the UE selects Radio Access Technology (RAT) in which the UE communicates with a Public Land Mobile Network (PLMN), that is, a network from which the UE is provided with service (S410). Information about the PLMN and the RAT may be selected by the user of the UE, and the information stored in a Universal Subscriber Identity Module (USIM) may be used.

The UE selects a cell that has the greatest value and that belongs to cells having measured BS and signal intensity or quality greater than a specific value (cell selection) (S420). In this case, the UE that is powered off performs cell selection, which may be called initial cell selection. A cell selection procedure is described later in detail. After the cell selection, the UE receives system information periodically by the BS. The specific value refers to a value that is defined in a system in order for the quality of a physical signal in data transmission/reception to be guaranteed. Accordingly, the specific value may differ depending on applied RAT.

If network registration is necessary, the UE performs a network registration procedure (S430). The UE registers its information (e.g., an IMSI) with the network in order to receive service (e.g., paging) from the network. The UE does not register it with a network whenever it selects a cell, but registers it with a network when information about the network (e.g., a Tracking Area Identity (TAI)) included in system information is different from information about the network that is known to the UE.

The UE performs cell reselection based on a service environment provided by the cell or the environment of the UE (S440). If the value of the intensity or quality of a signal measured based on a BS from which the UE is provided with service is lower than that measured based on a BS of a neighboring cell, the UE selects a cell that belongs to other cells and that provides better signal characteristics than the cell of the BS that is accessed by the UE. This process is called cell reselection differently from the initial cell selection of the No. 2 process. In this case, temporal restriction conditions are placed in order for a cell to be frequently reselected in response to a change of signal characteristic. A cell reselection procedure is described later in detail.

Hereinafter, Cell Selection Procedure and Cell Selection Procedure is Described.

A cell selection process is basically divided into two types.

The first is an initial cell selection process. In this process, UE does not have preliminary information about a wireless channel. Accordingly, the UE searches for all wireless channels in order to find out a proper cell. The UE searches for the strongest cell in each channel Thereafter, if the UE has only to search for a suitable cell that satisfies a cell selection criterion, the UE selects the corresponding cell.

Next, the UE may select the cell using stored information or using information broadcasted by the cell. Accordingly, cell selection may be fast compared to an initial cell selection process. If the UE has only to search for a cell that satisfies the cell selection criterion, the UE selects the corresponding cell. If a suitable cell that satisfies the cell selection criterion is not retrieved though such a process, the UE performs an initial cell selection process.

After the UE selects a specific cell through the cell selection process, the intensity or quality of a signal between the UE and a BS may be changed due to a change in the mobility or wireless environment of the UE. Accordingly, if the quality of the selected cell is deteriorated, the UE may select another cell that provides better quality. If a cell is reselected as described above, the UE selects a cell that provides better signal quality than the currently selected cell. Such a process is called cell reselection. In general, a basic object of the cell reselection process is to select a cell that provides UE with the best quality from a viewpoint of the quality of a radio signal.

In addition to the viewpoint of the quality of a radio signal, a network may determine priority corresponding to each frequency, and may inform the UE of the determined priorities. The UE that has received the priorities preferentially takes into consideration the priorities in a cell reselection process compared to a radio signal quality criterion.

As described above, there is a method of selecting or reselecting a cell according to the signal characteristics of a wireless environment. In selecting a cell for reselection when a cell is reselected, the following cell reselection methods may be present according to the RAT and frequency characteristics of the cell.

Intra-frequency cell reselection: UE reselects a cell having the same center frequency as that of RAT, such as a cell on which the UE camps on.

Inter-frequency cell reselection: A UE reselects a cell having a different center frequency from that of RAT, such as a cell on which the UE camps on Inter-RAT cell reselection: A UE reselects a cell that uses RAT different from RAT on which the UE camps The principle of a cell reselection process is as follows.

First, UE measures the quality of a serving cell and neighbor cells for cell reselection.

Second, cell reselection is performed based on a cell reselection criterion. The cell reselection criterion has the following characteristics in relation to the measurements of a serving cell and neighbor cells.

Intra-frequency cell reselection is basically based on ranking. Ranking is a task for defining a criterion value for evaluating cell reselection and numbering cells using criterion values according to the size of the criterion values. A cell having the best criterion is commonly called the best-ranked cell. The cell criterion value is based on the value of a corresponding cell measured a UE, and may be a value to which a frequency offset or cell offset has been applied, if necessary.

Inter-frequency cell reselection is based on frequency priority provided by a network. UE attempts to camp on a frequency having the highest frequency priority. A network may provide frequency priority that will be applied by UEs within a cell in common through broadcasting signaling, or may provide frequency-specific priority to each UE through UE-dedicated signaling. A cell reselection priority provided through broadcast signaling may refer to a common priority. A cell reselection priority for each UE set by a network may refer to a dedicated priority. If receiving the dedicated priority, the UE may receive a valid time associated with the dedicated priority together. If receiving the dedicated priority, the UE starts a validity timer set as the received valid time together therewith. While the valid timer is operated, the UE applies the dedicated priority in the RRC idle mode. If the valid timer is expired, the UE discards the dedicated priority and again applies the common priority.

For the inter-frequency cell reselection, a network may provide a UE with a parameter (e.g., a frequency-specific offset) used in cell reselection for each frequency.

For the intra-frequency cell reselection or the inter-frequency cell reselection, a network may provide UE with a Neighboring Cell List (NCL) used in cell reselection. The NCL includes a cell-specific parameter (e.g., a cell-specific offset) used in cell reselection.

For the intra-frequency or inter-frequency cell reselection, a network may provide a UE with a cell reselection black list used in cell reselection. The UE does not perform cell reselection on a cell included in the black list.

Hereinafter, a Handover Procedure Will be Described.

Figure 5A:
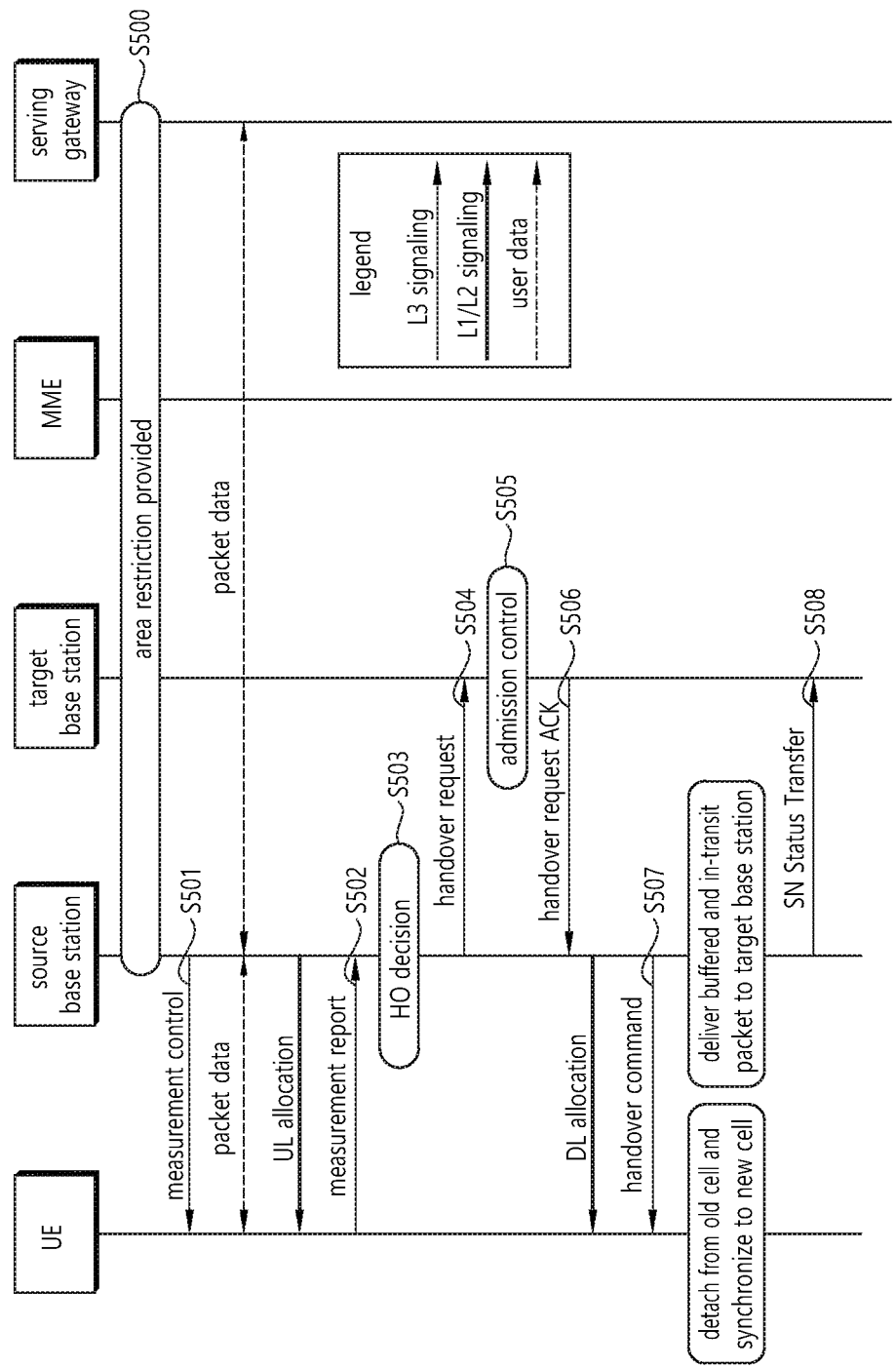
FIG. 5A and FIG. 5B show an example of a handover procedure.
Figure 5B:
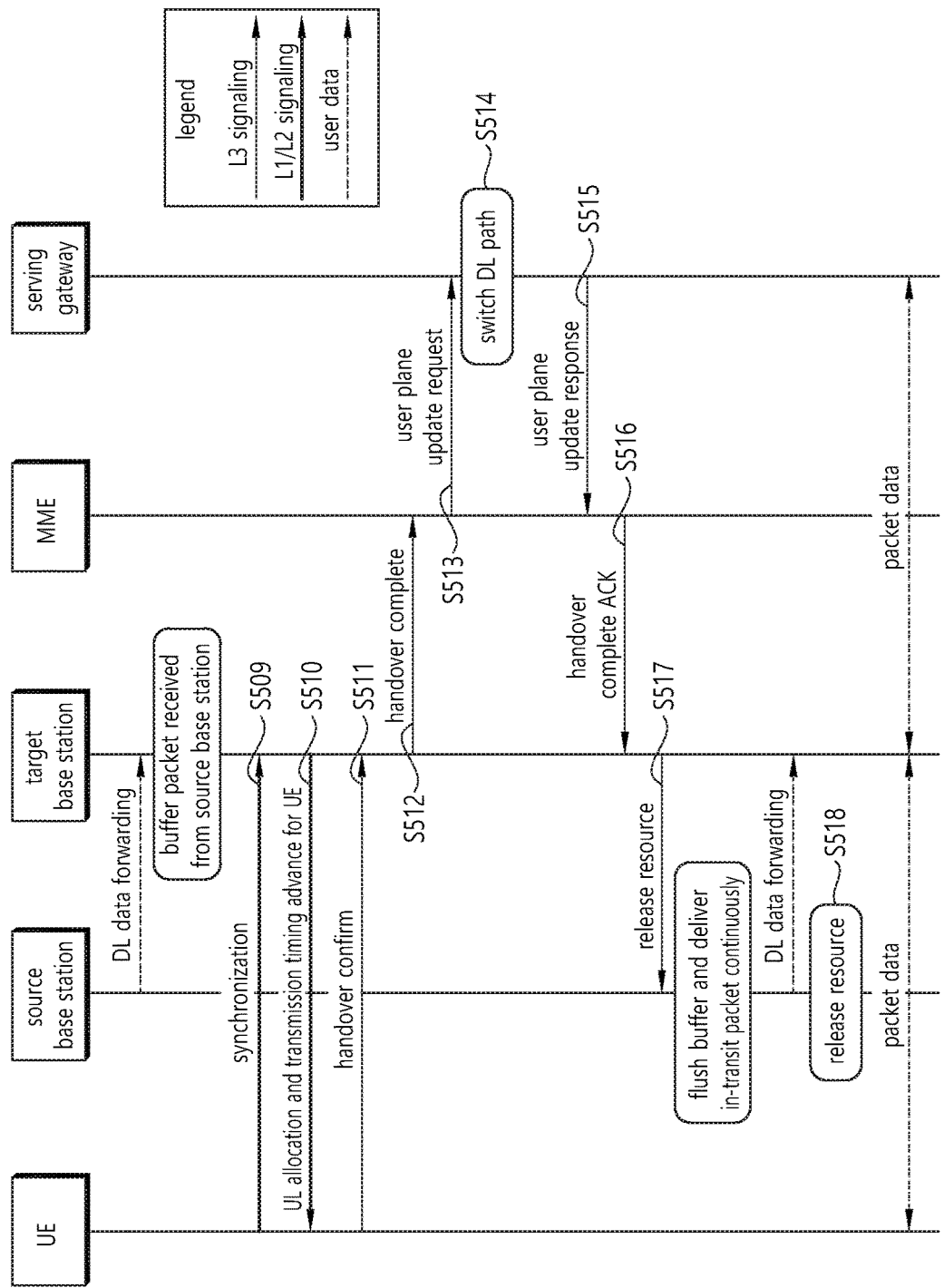

FIG. 5A and FIG. 5B show an example of a handover procedure. Specifically, FIG. 5A and FIG. 5B show a handover procedure when an MME and an S-GW are not changed. The handover procedure is described below in detail.

Referring to FIG. 5A, in step S500, a UE context within a source base station may include information regarding a roaming restriction provided either at connection establishment or at the last TA update.

In step S501, the source base station may configure UE measurement procedures according to access restriction information. Measurements provided by the source base station may assist a function controlling UE's connection mobility.

In step S502, a measurement report may be triggered and transmitted to the base station.

In step S503, the source base station may make decision based on the measurement report and radio resource management (RRM) information to hand off the UE.

In step S504, the source base station may transmit information necessary for handover to a target base station through a handover request message. The information necessary for handover may include a UE X2 signalling context reference, a UE S1 EPC signalling context reference, a target cell ID, an RRC context including a UE identifier (e.g., cell radio network temporary identifier (C-RNTI)) in the source base station, or the like.

In step S505, admission control may be performed by the target base station dependent on the received E-RAB QoS information to increase the likelihood of a successful handover, if resources can be granted by the target base station.

In step S506, the target base station may prepare a handover with L1/L2 and transmit a handover request ACK message to the source base station. The handover request ACK message may include a transparent container (RRC message) to be transmitted to the UE to perform the handover. The container may include a new C-RNTI and a target base station's security algorithm identifier. In addition, the container may further include some other parameters i.e. access parameters, SIBs, etc.

In step S507, the source base station may generate an RRC message (e.g., an RRC connection reconfiguration message) including mobility control information for the UE in order to perform the handover. The RRC connection reconfiguration message may include parameters necessary for the handover (e.g., new C-RNTI, target base station security algorithm identifier, and optionally dedicated RACH signature information, target base station SIB, etc.), and may command to perform the handover.

In step S508, the source base station may transmit a serial number (SN) status transfer message to the target base station to convey an uplink PDCP SN receiver status and a downlink PDCP SN transmitter status.

Referring to FIG. 5B, in step S509, after receiving the RRC connection reconfiguration message including the mobility control information, the UE may perform synchronization with the target base station and access a target cell through an RACH. If a dedicated RACH preamble is allocated, the RACH is performed in a contention-free manner, and otherwise, is performed in a contention-based manner.

In step S510, the target base station may respond with uplink allocation and timing advance.

In step S511, when the UE has successfully accessed the target cell, the UE may transmit an RRC connection reconfiguration complete message (C-RNTI) to confirm the handover, along with an uplink buffer status report, to inform the target base station that the handover procedure is complete. The target base station may verify the C-RNTI transmitted in the RRC connection reconfiguration complete message. The target base station can now begin transmitting data to the UE.

In step S512, the target base station may transmit a path switch request message to an MME to inform that the UE has changed a cell.

In step S513, the MME may transmit a user plane update request message to an S-GW.

In step S514, the S-GW may switch a downlink data path to a target side. The S-GW may transmit an end marker packet on the old path to the source base station and thereafter may release a user plane/TNL resource towards the source base station.

In step S515, the S-GW may transmit a user plane update response message to the MME.

In step S516, the MME may respond to the path switch request message by using a path switch request ACK message.

In step S517, by transmitting a UE context release message, the target base station may inform a success of the handover to the source base station and may trigger the release of resources by the source base station.

In step S518, upon reception of the UE context release message, the source base station may release a radio resource and a user plane related resource associated with the UE context.

The UE may fail to transmit/receive data from a time at which the UE disconnects a radio connection with a serving base station to a time at which downlink data is first received upon success of a random access channel (RACH) procedure for the target base station. A time for which the UE cannot transmit/receive data may be called a handover interrupt time. Referring to FIG. 5B, steps S509 to S511 may be steps corresponding to the handover interrupt time. A handover without an RACH procedure (hereinafter, an RACH-less handover) was introduced to minimize a service interrupt time and delay caused by the handover interrupt time during a handover. The RACH-less handover was proposed to minimize the handover interrupt time by skipping the RACH procedure (i.e., steps S509 and S510 of FIG. 5B) during the handover procedure.

At present, initial power control in PUSCH for transmitting an RRC connection reconfiguration complete message may be based on PRACH preamble power and total power ramp. However, it may be impossible to refer to the PRACH preamble power and the total power ramp since the RACH-less handover skips the RACH procedure in the handover procedure. That is, initial power control may be impossible in the PUSCH. Therefore, there is a need to newly propose a method of controlling initial uplink power to effectively perform initial power control in the PUSCH when applying the RACH-less handover. Hereinafter, a method of controlling initial uplink power in an RACH-less handover procedure and an apparatus supporting the method will be described in detail according to an embodiment of the present invention.

Figure 6:
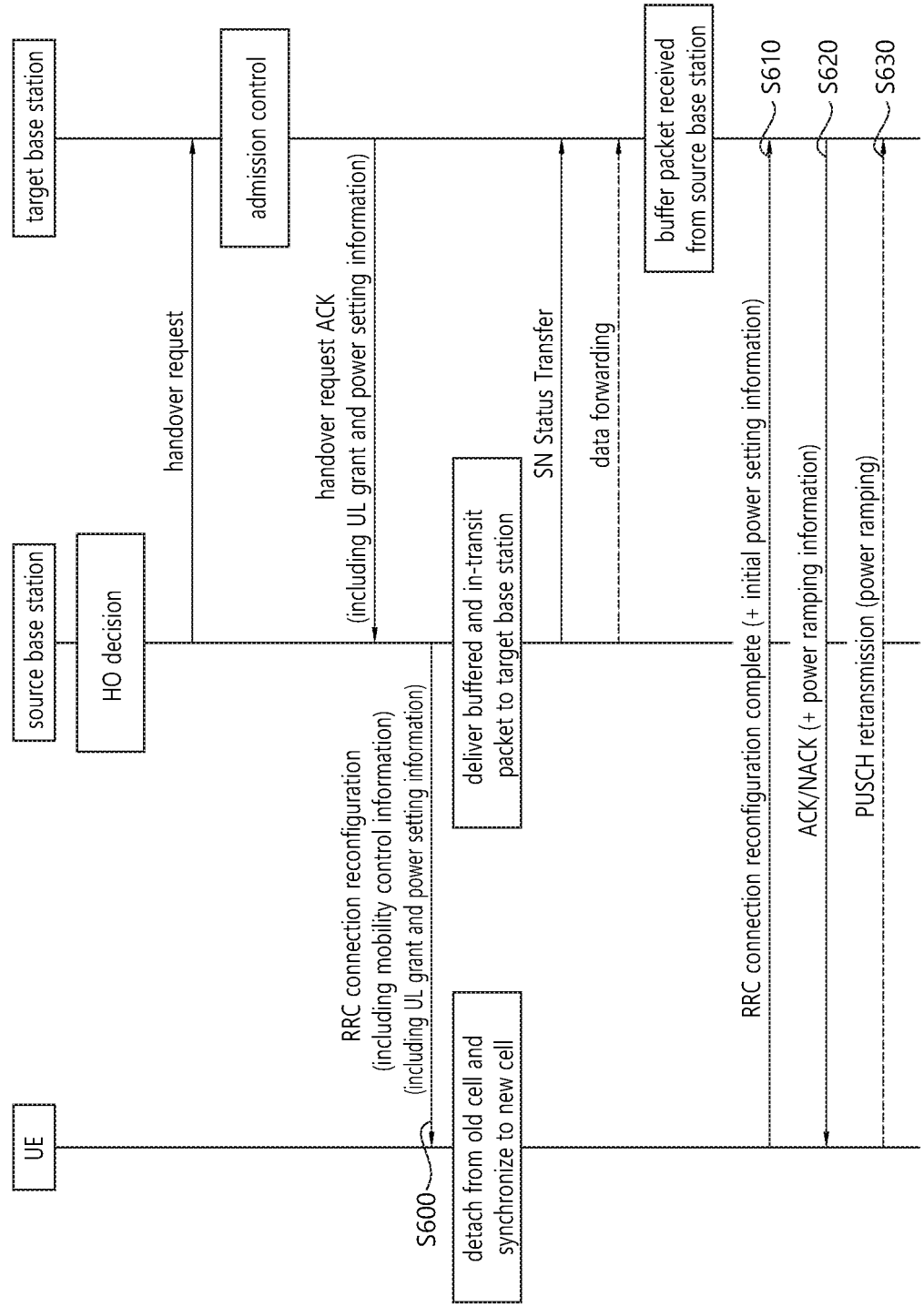
FIG. 6 shows a procedure of controlling initial uplink power in an RACH-less handover procedure according to an embodiment of the present invention.

FIG. 6 shows a procedure of controlling initial uplink power in an RACH-less handover procedure according to an embodiment of the present invention.

Referring to FIG. 6, in step S600, a UE may receive from a source base station an RRC connection reconfiguration message including an uplink grant. That is, the UE may be configured with an uplink grant in a handover command. Unlike in the conventional handover procedure, in the RACH-less handover procedure, the uplink grant may be pre-allocated to the UE through an RRC message. For example, a target base station may transmit the uplink grant determined by the target base station to the source base station by including the uplink grant into a handover request ACK message, and the source base station may transmit the uplink grant received from the target base station to the UE by including the uplink grant into the RRC connection reconfiguration message.

The uplink grant may indicate when it starts handover execution from the source base station to the target base station. In addition, the uplink grant may be directly used by the UE in order to transmit the RRC connection reconfiguration complete message to the target base station. The RRC connection reconfiguration message may include mobility control information.

Alternatively, in step S600, the UE may receive from the source base station the RRC connection reconfiguration message including the uplink grant and power setting information. That is, the UE may be configured with not only the uplink grant but also the power setting information. The power setting information may be information determined by the target base station for initial uplink transmission. The power setting information may include at least any one of power ramping information and initial PUSCH power information for performing initial uplink transmission by the UE.

In step S610, if the UE receives from the source base station the RRC connection reconfiguration message including the uplink grant, the UE may determine initial PUSCH transmission power. The initial PUSCH transmission power may be randomly determined by the UE. In addition, the UE may transmit to the target base station the RRC connection configuration complete message based on the uplink grant and the determined initial PUSCH transmission power. In this case, the RRC connection reconfiguration complete message may be transmitted with initial PUSCH transmission power determined by the UE.

Alternatively, if the UE receives from the source base station the RRC connection reconfiguration message including the uplink grant and the power setting information, the UE may consider the power setting information instead of the RACH preamble and total power ramp. The power setting information may indicate initial PUSCH transmission power to the UE. In addition, the UE may transmit the RRC connection reconfiguration complete message to the target base station based on the uplink grant and the indicated initial PUSCH transmission power. In this case, the RRC connection reconfiguration complete message may be transmitted with initial PUSCH transmission power determined by the target base station.

In step S620, after the initial PUSCH transmission, PUSCH power ramping for uplink retransmission may be handled. For example, the PUSCH power ramping may be handled by a PHICH. The PHICH may include power ramping information in addition to HARQ ACK/NACK. That is, the UE may receive the HARQ ACK/NACK and the power ramping information through the PHICH. Alternatively, the UE may receive the HARQ ACK/NACK through the PHICH, and may receive the power ramping information through another channel.

The power ramping information may include a ramping indication and a ramping level. The ramping indication may indicate whether the ramping procedure will be stopped or not. The ramping level may indicate a required ramping level. For example, the ramping level may include multiple times of ramping step.

In step S630, if the UE receives power ramping information and/or ACK/NACK, the UE may perform PUSCH retransmission as follows.

If the UE receives ACK, the UE may stop PUSCH retransmission.

If the UE receives NACK and ramping information in response to initial PUSCH transmission, the UE may consider the ramping information in order to determine PUSCH retransmission power. The UE may perform the PUSCH retransmission based on the power ramping information.

Figure 7:
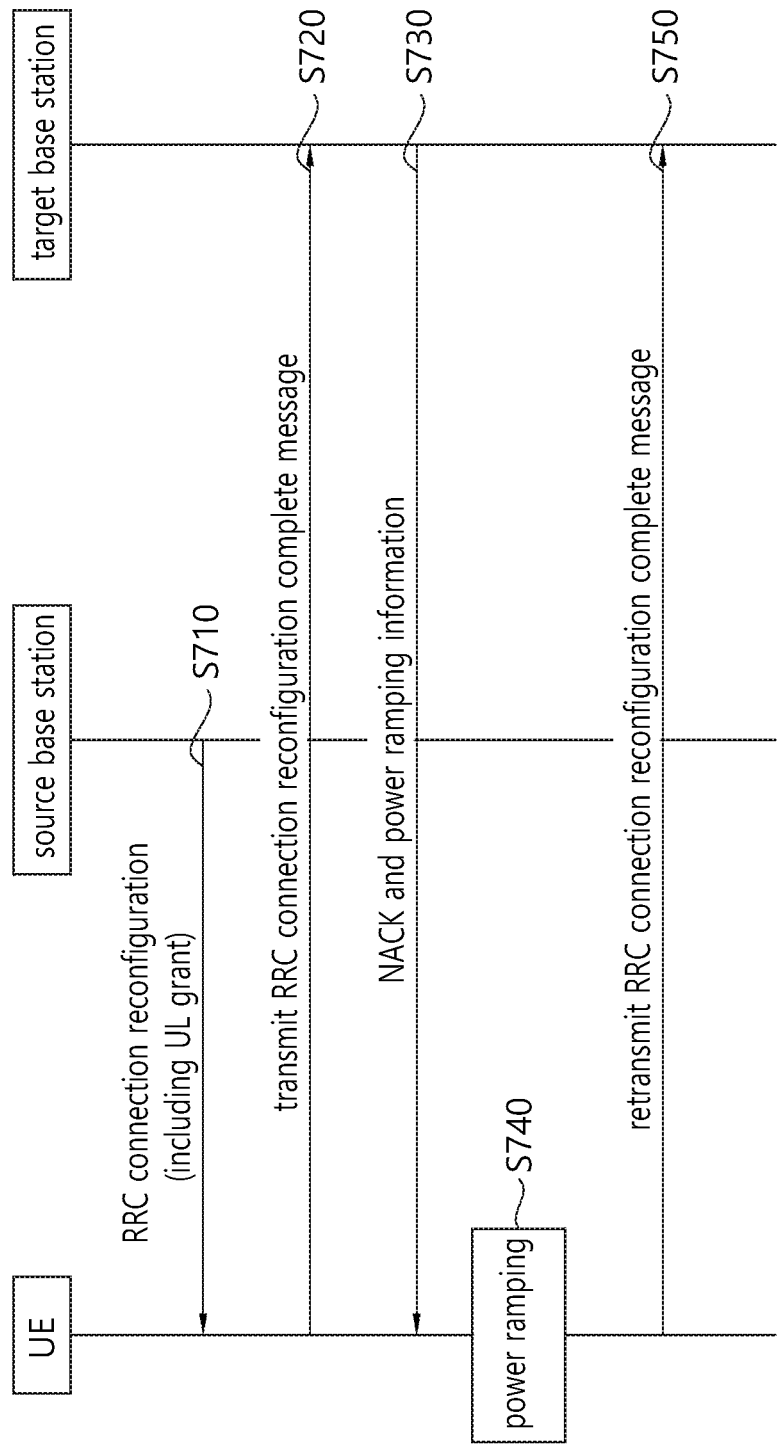
FIG. 7 shows a procedure of controlling uplink power in an RACH-less handover procedure according to an embodiment of the present invention.

FIG. 7 shows a procedure of controlling uplink power in an RACH-less handover procedure according to an embodiment of the present invention. In the present specification, the RACH-less handover implies a handover procedure in which a random access procedure is skipped. That is, the RACH-less handover implies a handover procedure in which a UE skips a random access procedure for a target base station. For example, in the RACH-less handover, the UE may access the target base station through an uplink grant pre-allocated to the UE while skipping the random access procedure for the target base station.

Referring to FIG. 7, in step S710, the UE may receive an RRC connection reconfiguration message including an uplink grant from a source base station. The uplink grant may be transmitted from the target base station to the source base station by being included in a handover request ACK message. That is, the uplink grant determined by the target base station may be transmitted to the source base station, and the source base station may transmit the received uplink grant to the UE. The uplink grant may be pre-allocated to the UE through the RRC connection reconfiguration message.

In step S720, the UE may transmit to the target base station an RRC connection reconfiguration complete message with first transmission power. The RRC connection reconfiguration complete message may be transmitted to the target base station through a physical uplink shared channel (PUSCH).

The first transmission power may be determined by the UE. Alternatively, the first transmission power may be determined by the target base station. In this case, the RRC connection reconfiguration message may further include information on the first transmission power and power ramping.

In step S730, the UE may receive NACK from the target base station in response to the RRC connection reconfiguration complete message. In addition, the UE may further receive ramping information in response to the RRC connection reconfiguration complete message. The NACK and the ramping information may be received from the target base station through a physical hybrid ARQ indicator channel (PHICH).

The ramping information may include a ramping level for ramping the first transmission power to the second transmission power. The ramping information may include an indicator indicating whether power ramping will be stopped or not.

In step S740, the UE may ramp the first transmission power to the second transmission power. The second transmission power may be ramped from the first transmission power based on the ramping level.

In step S750, the UE may transmit the RRC connection reconfiguration message with the ramped second transmission power. That is, the RRC connection reconfiguration complete message may be retransmitted with the ramped second transmission power. The RRC connection reconfiguration complete message may be retransmitted to the target base station through a physical uplink shared channel (PUSCH).

According to the procedure proposed in the present specification, a UE may determine uplink transmission power in an RACH-less handover procedure. Further, the UE may perform uplink retransmission by handling the determined uplink transmission power by the use of power ramping information.

Figure 8:
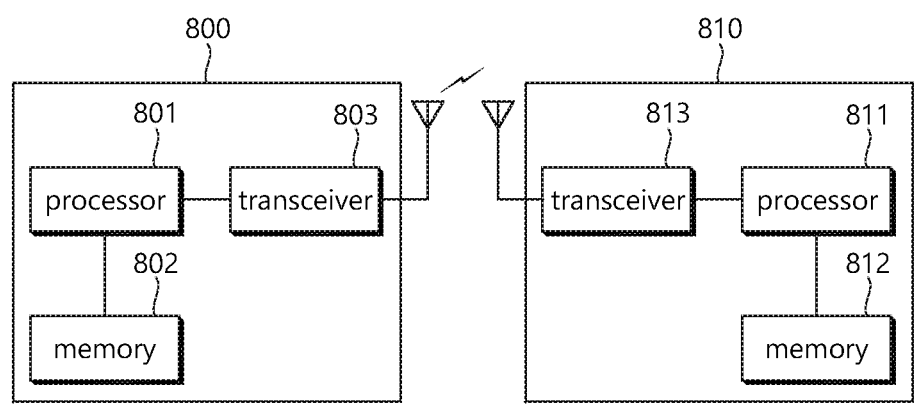
FIG. 8 is a block diagram illustrating a wireless communication system according to the embodiment of the present invention.

FIG. 8 is a block diagram illustrating a wireless communication system according to the embodiment of the present invention.

A BS 800 includes a processor 801, a memory 802 and a transceiver 803. The memory 802 is connected to the processor 801, and stores various information for driving the processor 801. The transceiver 803 is connected to the processor 801, and transmits and/or receives radio signals. The processor 801 implements proposed functions, processes and/or methods. In the above embodiment, an operation of the BS may be implemented by the processor 801.

A UE 810 includes a processor 811, a memory 812 and a transceiver 813. The memory 812 is connected to the processor 811, and stores various information for driving the processor 811. The transceiver 813 is connected to the processor 811, and transmits and/or receives radio signals. The processor 811 implements proposed functions, processes and/or methods. In the above embodiment, an operation of the UE may be implemented by the processor 811.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The transceiver may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Various methods based on the present specification have been described by referring to drawings and reference numerals given in the drawings on the basis of the aforementioned examples. Although each method describes multiple steps or blocks in a specific order for convenience of explanation, the invention disclosed in the claims is not limited to the order of the steps or blocks, and each step or block can be implemented in a different order, or can be performed simultaneously with other steps or blocks. In addition, those ordinarily skilled in the art can know that the invention is not limited to each of the steps or blocks, and at least one different step can be added or deleted without departing from the scope and spirit of the invention.

The aforementioned embodiment includes various examples. It should be noted that those ordinarily skilled in the art know that all possible combinations of examples cannot be explained, and also know that various combinations can be derived from the technique of the present specification. Therefore, the protection scope of the invention should be determined by combining various examples described in the detailed explanation, without departing from the scope of the following claims.

What is claimed is:

1. A method for controlling uplink power in a random access channel (RACH)-less handover by a user equipment (UE), the method comprising:

receiving, from a source base station, a radio resource control (RRC) reconfiguration message including an uplink grant and power setting information on first transmission power and power ramping,
wherein the uplink grant and the power setting information are determined by a target base station;
transmitting, to the target base station, an RRC reconfiguration complete message with the first transmission power based on the uplink grant and the power setting information;

receiving non-acknowledgement (NACK) from the target base station in response to the RRC reconfiguration complete message;

ramping the first transmission power to second transmission power based on the power setting information which is determined by the target base station; and transmitting the RRC reconfiguration complete message with the ramped second transmission power.

2. The method of claim 1, further comprising:
receiving ramping information in response to the RRC reconfiguration complete message.

3. The method of claim 2, wherein the ramping information includes a ramping level for ramping the first transmission power to the second transmission power.

4. The method of claim 3, wherein the second transmission power is ramped from the first transmission power based on the ramping level.

5. The method of claim 2, wherein the ramping information includes information which informs the UE whether power ramping will be stopped or not.

6. The method of claim 2, wherein the NACK and the ramping information are received from the target base station through a physical hybrid ARQ indicator channel (PHICH).

7. The method of claim 1, wherein the RRC reconfiguration complete message is transmitted to the target base station through a physical uplink shared channel (PUSCH).

8. The method of claim 1, wherein the RACH-less handover is a handover procedure in which the UE skips a random access procedure for the target base station.

9. The method of claim 1, wherein the uplink grant is transmitted from the target base station to the source base station by being included in a handover request acknowledgement (ACK) message.

10. The method of claim 1, wherein the uplink grant is pre-allocated to the UE through the RRC reconfiguration message.

11. A user equipment (UE) for controlling uplink power in a random access channel (RACH)-less handover, the UE comprising:

a memory; a transceiver; and a processor coupling the memory and the transceiver, wherein the processor is configured to:

control the transceiver to receive, from a source base station, a radio resource control (RRC) reconfiguration message including an uplink grant and power setting information on first transmission power and power ramping, wherein the uplink grant and the power setting information are determined by a target base station;

control the transceiver to transmit, to the target base station, an RRC reconfiguration complete message with the first transmission power based on the uplink grant and the power setting information;

control the transceiver to receive NACK from the target base station in response to the RRC reconfiguration complete message;

ramp the first transmission power to second transmission power based on the power setting information which is determined by the target base station; and control the transceiver to transmit the RRC reconfiguration complete message with the ramped second transmission power.

12. The UE of claim 11, wherein the processor is configured to control the transceiver to receive ramping information in response to the RRC reconfiguration complete message.

13. The UE of claim 12, wherein the ramping information includes a ramping level for ramping the first transmission power to the second transmission power.

14. The UE of claim 13, wherein the second transmission power is ramped from the first transmission power based on the ramping level.

15. The UE of claim 12, wherein the ramping information includes information which informs the UE whether power ramping will be stopped or not.

16. The UE of claim 12, wherein the NACK and the ramping information are received from the target base station through a physical hybrid ARQ indicator channel (PHICH).

* * * * *